(12) United States Patent
Hayashi

(10) Patent No.: US 6,253,233 B1
(45) Date of Patent: Jun. 26, 2001

(54) MULTI-CUT SYSTEM

(75) Inventor: Shouichi Hayashi, Omiya (JP)

(73) Assignee: Wellbean Co., Inc. (JP)

( * ) Notice: Subject to any disclaimer, the term of this patent is extended or adjusted under 35 U.S.C. 154(b) by 0 days.

(21) Appl. No.: 09/218,786

(22) Filed: Dec. 22, 1998

(30) Foreign Application Priority Data

Oct. 29, 1998 (JP) ................................. 10-324542

(51) Int. Cl.⁷ ..................................................... G06F 15/16
(52) U.S. Cl. ........................ 709/208; 709/211; 709/213; 709/216; 709/218; 709/219; 711/147
(58) Field of Search ........................... 711/147; 709/208, 709/211, 213, 216, 218, 219

(56) References Cited

U.S. PATENT DOCUMENTS 5,428,528 * 6/1995 Takenouchi et al. ................... 463/42
5,952,932 * 9/1999 slashed.rensen ................. 340/825.07
6,044,136 * 3/2000 Takahashi et al. ................. 379/93.23

* cited by examiner

*Primary Examiner*—Hiep T. Nguyen
(74) *Attorney, Agent, or Firm*—Steinberg & Raskin, P.C.

(57) ABSTRACT

A multi-CPU system capable of facilitating a change of a program for each of CPUs of a slave-side section and constructing a control program on a side of only a slave-side section, to thereby facilitate preparation of the control program. A shared memory is connected to buses, resulting in a multi-CPU system being separated into a master-side section and a slave-side section, with the shared memory being interposed therebetween. A measure/control function blocks connected to a measured/controlled equipment and a ROM stored therein with an activation program for downloading a program to a RAM of a slave CPU block are connected to the bus for the slave-side section. Then, the RAM is stored therein with the program down-loaded through the buses, resulting in the measured/controlled equipment being controlled according to the program.

7 Claims, 7 Drawing Sheets

MULTI-CUT SYSTEM

BACKGROUND OF THE INVENTION

This invention relates to a multi-CPU system for industrial use, and more particularly to a multi-CPU system which is suitable for mounting operation systems (OSs) different from each other in a master CPU block and in a slave CPU block, respectively.

Now, a conventional multi-CPU system will be described with reference to FIG. 7.

The conventional multi-CPU system includes a CPU 3 which has a ROM 4 and a RAM 5 connected to the RAM 4, to thereby constitute a master CPU block 2. The master CPU block 2 has a storage means 6, an input unit 7 such as a key board, a mouse or the like, and a monitor 8 connected thereto. The master CPU block 2 and the units connected directly thereto are operated by a user and referred to as a master-side section 1 in the lump herein. The CPU 3 is also connected through a bus 9 to slave blocks 15 and 21. The slave CPU blocks 15 and 21 include CPUs 11 and 17, respectively.

The CPU 11 has a communication means 10, a ROM 12, a RAM 13 and a measure/control function section 14 connected thereto. Likewise, the CPU 17 has a communication means 16, a ROM 18, a RAM 19 and a measure/control function section 20 connected thereto. The CPU 3 of the mater CPU block 2 is constructed so as to access to the communication means 10 and 16 of the slave CPU blocks 15 and 21. The slave CPU blocks 15 and 21 thus constructed are operated according to programs stored in the ROMs 12 and 18, respectively.

The measure/control function sections 14 and 20 are connected in common to an equipment which is to be subject to measure and control (hereinafter referred to as "measured/controlled equipment") designated at reference numeral 30. The measured/controlled equipment 30 is controlled by the CPUs 11 and 17. The slave CPU blocks 15 and 21 connected to the measured/controlled equipment 30 is referred to as a slave-side section 29 in the lump herein. The measure/control function sections 14 and 20 each include functions such as, for example, a contact input and output function, an analog/digital converter (hereinafter referred to "ADC"), a digital/analog converter (hereinafter referred to as "DAC") and the like.

Additional slave CPU blocks constructed in substantially the same manner as the slave CPU blocks 15 and 21 are arranged, to thereby ultimately provide the multi-CPU system.

In the conventional multi-CPU system thus constructed, the programs for the CPUs 11 and 17 of the slave CPU blocks 15 and 21 are stored in the ROMs 12 and 18, respectively. Thus, when it is required to change the programs in order to change a function of the slave CPU blocks 15 and 21, the ROMs 12 and 18 must be changed. However, a change of the ROMs is highly troublesome. For example, in-situ replacement of a built-in ROM of an equipment is highly troublesome, leading to an increase in maintenance cost.

Also, the conventional multi-CPU system is so constructed that the slave CPU blocks 15 and 21 are respectively operated according to the programs different from each other. This requires an additional program for adjusting a timing of operation of any one of the slave CPU blocks 15 and 21 associated with operation of the other slave CPU block. Also, such adjustment must be carried out by the CPU 3 of the master CPU block 2.

Now, this will be further described with reference to FIG. 7.

Control of the measured/controlled equipment 30 connected to the measure/control function blocks 14 and 20 requires in addition to the programs respectively stored in the ROMs 12 and 18 of the slave CPU blocks 15 and 21, an adjustment program for adjusting a timing of operation of the programs. Thus, the programs stored in the ROMs 12 and 18 and the adjustment program of the CPU 3 of the master-side section 1 cooperate with each other to constitute a control program for controlling the measured/controlled equipment 30.

Now, operation of the DAC by the slave CPU block 15 and operation of the ADC by the slave CPU block 21 for exchange of a signal through the measured/controlled equipment 30 will be described.

First of all, the slave CPU block 15 operates the DAC to feed an analog signal to the controlled/measured equipment 30, so that the measured/controlled equipment 30 may carry out some operation. Then, the measured/controlled equipment 30 feeds results of the operation in the form of an analog signal to the slave CPU block 21, so that the slave CPU block 21 digitalizes the signal and outputs it to the CPU 3. In such a signal exchange, the programs for the CPUs 11 and 17 are insufficient to permit a timing of operation between the CPUs 11 and 17 to be adjusted, because the CPUs 11 and 17 are operated by means of the programs different from each other. Thus, control of a timing at which the CPU 17 takes in a signal of the DAC is carried out through the communication means 16 by means of the CPU 3 of the master-side section 1.

However, in general, the CPUs 11 and 17 of the slave-side section 29 each are mounted therein with an operation system (hereinafter also referred to as "OS") which exhibits real time characteristics suitable for a control system and the CPU 3 of the master-side section 1 is mounted therein with an OS which is free of any real time properties but suitable for a user interface. The OS free of real time properties which is mounted on the CPU 3 of the master-side section 1 is not suitable for adjustment of a timing of operation of each of the blocks. Thus, adjustment of an operation timing of each block by means of such an OS renders a program of the whole system complicated, to thereby cause preparation of a control program therefor to be highly troublesome or difficult.

SUMMARY OF THE INVENTION

The present invention has been made in view of the foregoing disadvantage of the prior art.

Accordingly, it is an object of the present invention to provide a multi-CPU system which is capable of facilitating a change of a program for each of CPUs of a slave-side section.

It is another object of the present invention to provide a multi-CPU system which is capable of constructing a control program on only a side of a slave-side section, to thereby facilitate preparation of the control program.

In accordance with the present invention, a multi-CPU system is provided. The multi-CPU system includes a master CPU block having a storage means connected thereto, a slave CPU block including a CPU, a ROM and a RAM, a bus means arranged so as to connect the master CPU block and slave CPU block to each other therethrough, and a shared memory connected to an intermediate portion of the bus means. The shared memory is arranged so as to separate the multi-CPU system into a master-side section and a slave-side section therethrough. The bus means includes a bus arranged for the master-side section and a bus arranged for the slave-side section. The multi-CPU system also includes measure/control function blocks connected between the bus for the slave-side section and a measured/controlled equipment. The ROM of the slave CPU block is stored therein with an activation program for down-loading a program from the storage means to the RAM of the slave CPU block and is connected to the bus for the slave-side section. The RAM of the slave CPU block is stored therein with the program down-loaded from the storage means, resulting in the measured/controlled equipment being controlled through the measure/control function block according to the program.

Also, in accordance with the present invention, a multi-CPU system is provided. The multi-CPU system includes a master CPU block, a slave CPU block including a CPU, a ROM and a RAM, a bus means arranged so as to connect the master CPU block and slave CPU block to each other therethrough, network interfaces connected to the bus means, and a shared memory constructed so as to exhibit a network emulation function and connected to an intermediate portion of the bus means. The shared memory is arranged so as to separate the multi-CPU system into a master-side section and a slave-side section therethrough. The bus means includes a bus arranged for the master-side section and a bus arranged for the slave-side section. The multi-CPU system also includes measure/control function blocks connected between the bus for the slave-side section and a measured/controlled equipment. The ROM of the slave CPU block is stored therein with an activation program for down-loading a program to the RAM of the slave CPU block and is connected to the bus for the slave-side section. The RAM of the slave CPU block is stored therein with the program down-loaded through the bus means, resulting in the measured/controlled equipment being controlled through the measure/control function block according to the program.

In a preferred embodiment of the present invention, the network interfaces are arranged on the master-side section.

In a preferred embodiment of the present invention, the network interfaces are arranged on the slave-side section.

In a preferred embodiment of the present invention, the multi-CPU system further includes a storage means stored therein with a driver software for emulating the shared memory as a network interface.

In a preferred embodiment of the present invention, the ROM of the slave CPU block is stored therein with an activation program for down-loading the program to the RAM of the slave CPU block and connected directly to the bus for the slave-side section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout in principle; wherein.

DETAILED DESCRIPTION OF THE PREFERRED EMBODIMENTS

Now, a multi-CPU system according to the present invention will be described hereinafter with reference to FIGS. 1 to 6.

Figure 1:
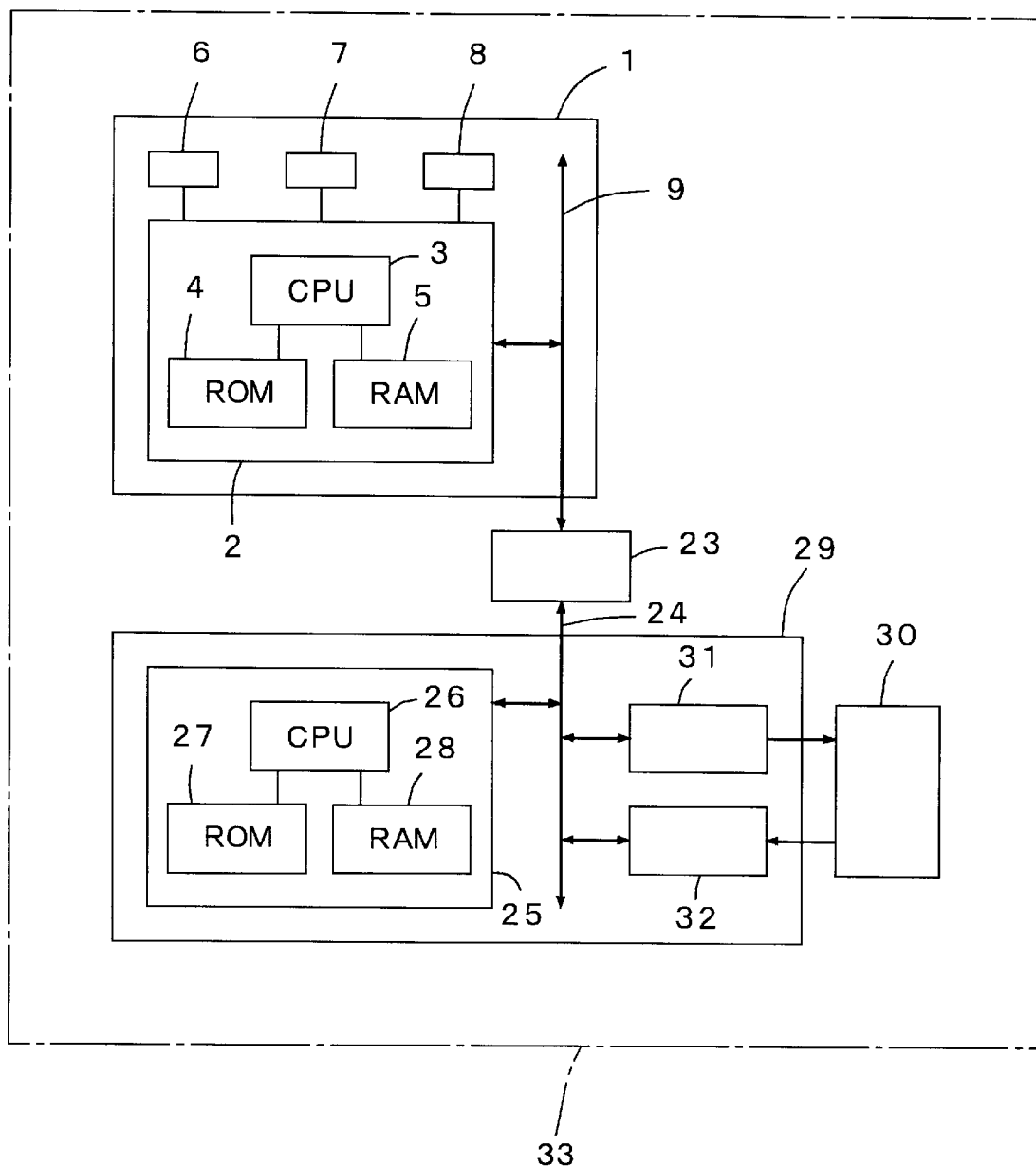
FIG. 1 is a block diagram showing a first embodiment of a multi-CPU system according to the present invention.
Figure 7:
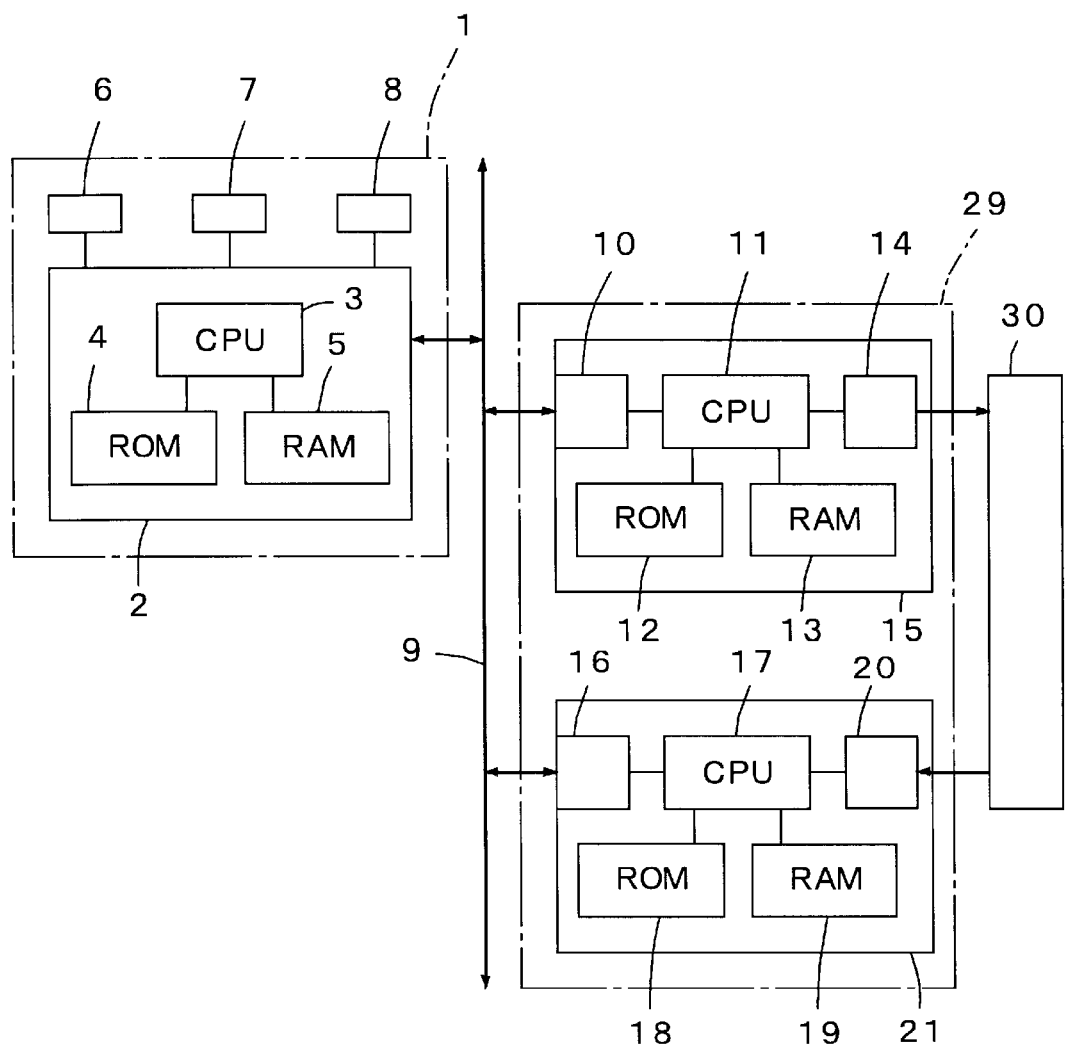
FIG. 7 is a block diagram showing a conventional multi-CPU system.

Referring first to FIG. 1, a first embodiment of a multi-CPU system according to the present invention is illustrated. A multi-CPU system of the illustrated embodiment which is generally designated at reference numeral 33 includes a master-side section 1 and a slave-side section 29 separated from each other with a shared memory 23 being interposed therebetween. The master-side section 1 is constituted of a master-CPU block 2 and units connected thereto as in the conventional multi-CPU system described above with reference to FIG. 7, except that the master-side section 1 includes a bus 9, which has the shared memory 23 connected to at one end thereof.

The shared memory 23 has a bus 24 connected thereto, which functions as a bus for the slave-side section 29. The bus 9 for the master-side section 1 and the bus 24 for the slave-side section 29 constitute a bus means. The bus 24 for the slave-side section 29 is connected to a slave CPU block 25 and a pair of measure/control function blocks 31 and 32. The slave CPU block 25 includes a CPU 26, a ROM 27 and a RAM 28. The measure/control function blocks 31 and 32 each are free of a CPU and exhibit substantially the same function as the measure/control function blocks 14 and 24 of the conventional multi-CPU system described above. Access to the measure/control function blocks 31 and 32 is carried out only from the bus 24 through the CPU 26.

Also, the ROM 27 has a starting-up or activation program for the CPU 26 stored therein. The activation program merely functions to down-load a program stored in a storage means 6 such as an FDD connected to the master-CPU block 2 or the like through a CPU 3. The activation program permits the program stored in the storage means 6 to be automatically down-loaded through the CPU 3, bus 9, shared memory 23 and bus 24 to the RAM 28 at the time of starting-up or activation of the multi-CPU system. The program down-loaded to the RAM 28 is an operation program for the CPU 26 of the slave-side section 29. The operation program functions as a control program for controlling a function of the measure/control function blocks 31 and 32 and an operation timing thereof.

Now, the manner of controlling the measured/controlled equipment 30 by the multi-CPU system of the illustrated embodiment will be described.

First, when the system is started up or activated, an operation system of the master-side section 1 is activated, resulting in the control program being down-loaded from the storage means 6 of the master-side section 1 to the RAM 28 of the slave-side section 29. Then, the CPU 26 of the slave-side section 29 controls the measure/control function blocks 31 and 32 according to the control program.

The following description will be made supposing that the measure/control function block 31 functions as a DAC and the measure/control function block 32 functions as an ADC.

When the measure/control function block 31 functions as a DAC to output an analog signal to the measured/controlled equipment 30, the measured/controlled equipment 30 carries out operation according to the analog signal and then outputs results of the operation in the form of an analog signal to the measure/control function block 32. The measure/control function block 32 takes in the analog signal from the measured/controlled equipment 30, to thereby function as an ADC, resulting in returning a digital signal to the CPU 26. At this time, the CPU 26 also functions to control a timing at which the measure/control function block 31 outputs the analog signal, that at which the measure/control function block 32 takes in the analog signal outputted from the measured/controlled equipment 30 and that at which the measure/control function block 32 outputs the digital signal to the CPU 26. In such a conventional multi-CPU system as described above, such timing control is carried out by the CPU of the master-side section 1.

Thus, the multi-CPU system of the illustrated embodiment is so constructed that control of operation of the measure/control function blocks 31 and 32 connected to the bus 24 for the slave-side section 29 is carried out by only the CPU 26. Such construction eliminates a necessity of timing control by the CPU of the mater-side section 1 as in the conventional multi-CPU system described above. This permits the OS of the master-side section 1 to be kept from being involved in the control program of the slave-side section 29, resulting in preparation of the control program being facilitated. Also, the operation program for the CPU 26 is down-loaded from the master-side section 1 to the RAM 28 of the slave CPU block 25 of the slave-side section 25, resulting in being executed, to thereby eliminate a necessity of modifying the ROM at the time of change of the program which is carried out in the prior art.

The master CPU block 2 and slave CPU block 25 described above may be realized using any suitable board commercially available such as, for example, a PC/AT compatible or interchangeable board, a VME board or the like. Also, the measure/control function blocks 31 and 32 each may be likewise realized using any suitable commercially available board. The shared memory 23, the buses 9 and 31, and a back board mounted thereon with sockets for the above-described boards may be permitted to cooperate with each other to realize the system of the illustrated embodiment.

The ROM 27 constituted of such a commercially available board does not have the activation program for down-loading the program of the master-side section 1 through the shared memory 23 set therein, therefore, it is required to store the activation program in the ROM 27.

The multi-CPU system of the illustrated embodiment, as described above, is so constructed that two such measure/control function blocks 31 and 32 are connected to the bus 24 for the slave-side section 29. Alternatively, a number of measure/control function blocks which are identical or different in function with or from each other may be connected to the bus 24. In this instance as well, all the measure/control function blocks connected to the bus 24 for the slave-side section 29 may be controlled through the CPU 26 of the slave-side section 29.

Figure 2:
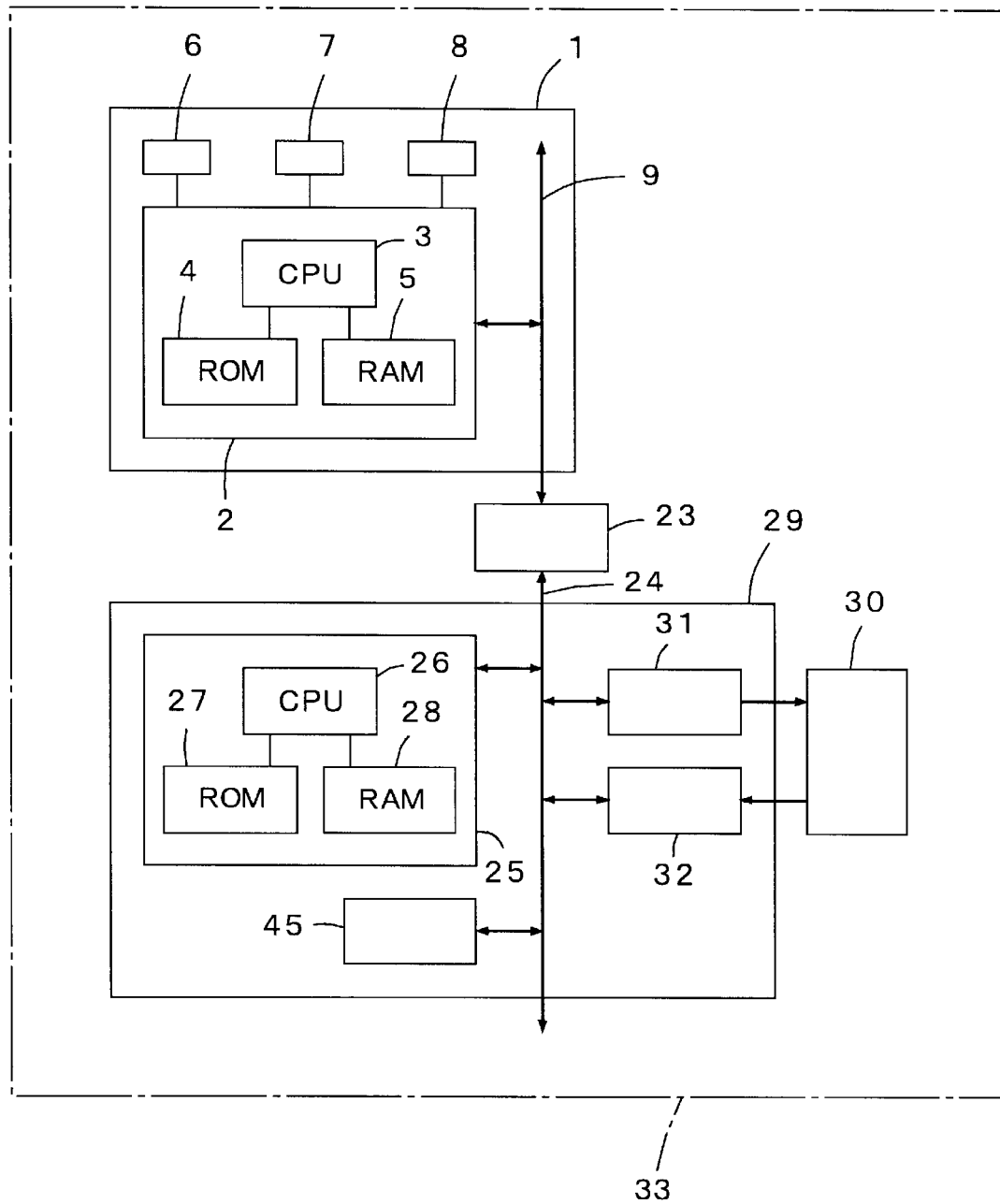
FIG. 2 is a block diagram showing a second embodiment of a multi-CPU system according to the present invention.

Referring now to FIG. 2, a second embodiment of a multi-CPU system according to the present invention is illustrated. A multi-CPU system of the illustrated embodiment which is designated at reference numeral 33 is constructed in substantially the same manner as the first embodiment described above, except that a ROM 45 is connected to a bus 24 for a slave-side section 29. A slave CPU block 25 may be constituted by any suitable board means commercially available such as, for example, a PC/AT compatible board or the like. The ROM 45 is stored therein with an activation program for down-loading a program to a RAM 28 of the slave CPU block 25 as in the ROM 27 in the first embodiment described above.

Upon starting-up or activation of the multi-CPU system 33 of the illustrated embodiment, a control program stored in a storage means 6 of a master-side section 1 is down-loaded to the RAM 28 of the slave-side section 29. Then, the control program stored in the RAM 28 permits the CPU 26 to control measure/control function blocks 31 and 32 as in the first embodiment described above.

In the multi-CPU system 33 of the illustrated embodiment, the ROM 45 having the activation program for down-loading stored therein is connected to the bus 24, to thereby eliminate a necessity of setting the activation program in the ROM 27 of the slave CPU block 25. This permits a commercially available board which is not involved in setting of the activation program to be used for the ROM 27.

Figure 3:
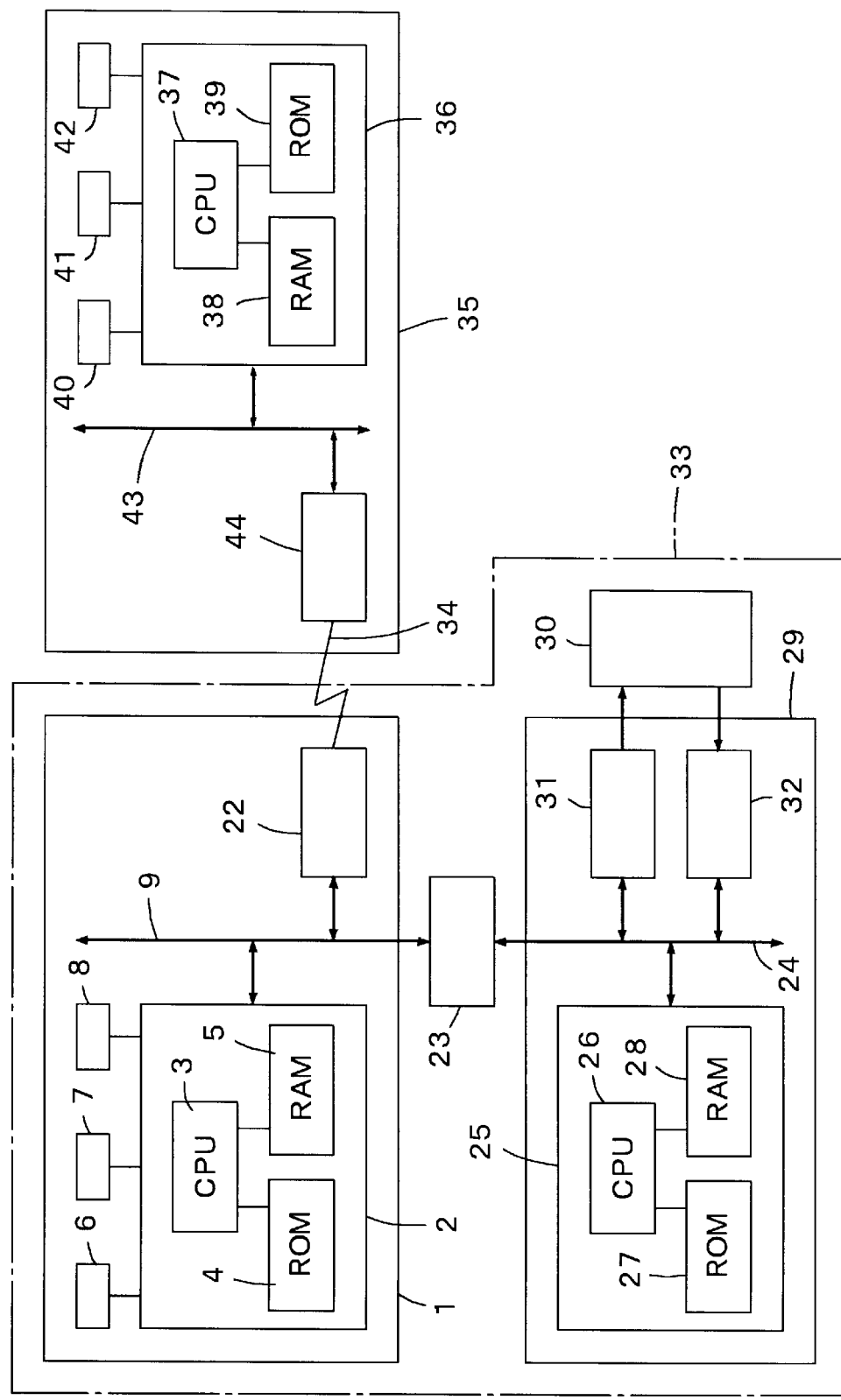
FIG. 3 is a block diagram showing a third embodiment of a multi-CPU system according to the present invention.

Referring now to FIG. 3, a third embodiment of a multi-CPU system according to the present invention is illustrated. A multi-CPU system of the illustrated embodiment which is designated at reference numeral 33 has a host computer 35 connected thereto through a communication line 34. The host computer 35 may have a plurality of such multi-CPU systems 33 connected thereto, to thereby constitute a network. In this instance, the individual multi-CPU systems 33 are constructed in the same manner. Thus, one such multi-CPU system 33 will be described hereinafter.

The multi-CPU system 33 of the illustrated embodiment is divided into two sections or a master-side section 1 and a slave-side section 29 with a shared memory 23 being interposedly arranged therebetween. A master CPU block 2 and units connected thereto which cooperate with each other to constitute the master-side section 1 may be constructed in substantially the same manner as those in the first embodiment described above. The slave-side section 29 likewise may be constructed in substantially the same manner as that in the first embodiment.

A bus 9 for the master-side section 1 has a network interface 22 connected thereto. The network interface 22 has the host computer 35 connected thereto through the communication line 34. The host computer 35 may be constructed in substantially the same manner as the master-side section 1.

More specifically, the host computer 35 includes a CPU block 36 constituted of a CPU 37, a ROM 39 and a RAM 38. Also, the host computer 35 includes a storage means 40, an input unit 41 and a monitor 42 each connected to the CPU block 36. The CPU block 36 is connected through a bus 43 to a network interface 44. The network interface 44 is then connected to the network interface 22 of the master-side section 1 through the communication line 34. The storage means 40 of the host computer 35 is stored therein with a driver software for driving the network interface 44 and an operation program for down-loading a program to a RAM 28 of a slave-side section 29.

The master-side section 1 includes a storage means 6, which is stored therein with a driver software for driving the network interface 22, as well as a driver software for emulating the shared memory 23 as a network interface.

A slave CPU block 21 includes a ROM 27, which is stored therein with a driver software for emulating the shared memory 23 as a network interface, as well as an activation program for a CPU 26. The activation program merely functions to down-load a program from the host computer 35 through the shared memory 23 emulated as a network interface. Thus, the activation program permits the program to be automatically down-loaded through the CPU 37 of the CPU block 36 to the RAM 28 of the slave CPU block 21. The program down-loaded to the RAM 28 of the slave CPU block 21 contributes to control of a function of each of measure/control function blocks 31 and 32 and a timing of operation thereof in substantially the same manner as in the first embodiment described above.

Now, the manner of control of a measured/controlled equipment 30 by the multi-CPU system of the illustrated embodiment will be described hereinafter.

First of all, the multi-CPU system is started or activated, resulting in an operation system (OS) of the master-side section 1, so that a user may be accessible to the network interface 22. Also, the driver software stored in the storage means 6 permits the shared memory 23 to function as a network interface from the master-side section 1, so that the shared memory 23 and network interface 22 may be coupled to each other by means of the software as required for data transfer or the like.

Concurrently, the driver software stored in the ROM 27 of the slave CPU block 21 likewise permits the shared memory 23 to function as an interface from the slave-side section 29 as well, so that the shared memory 23 may be available as an network interface from both the master-side section 1 and slave-side section 29.

Also, in the host computer 35 outside the multi-CPU system 33 as well, an operation system is likewise activated as in the master-side section 1, so that the network interface 44 may be available or accessible. This permits communication to be established between the host computer 35 connected to the master-side section 1 and slave-side section 29 through the communication line 34 and the slave-side section 1 and slave-side section 29.

Then, the operation program is down-loaded to the RAM 28 of the slave CPU block 21 by means of the activation program stored in the ROM 27 of the slave CPU block 21. The CPU 26 controls the measure/control function blocks 31 and 32 according to the operation program in substantially the same manner as in the first embodiment described above.

Thus, the control operation for the measure/control function blocks 31 and 32 connected to the bus 24 of the slave-side section 29 is carried out by only the CPU 26, so that timing control by the CPU of the master-side section 1 required in the prior art may be eliminated.

Also, the operation program for the CPU 26 of the slave CPU block 25 is down-loaded from the host computer 35 through the master-side section 1 to the RAM 28 of the slave CPU block 25, resulting in being executed, so that modification of the ROM during a change of the program required in the prior art may be eliminated. The illustrated embodiment merely requires to store a new operation program in the storage means 40 of the host computer 35 such as, for example, an FDD.

In addition, a plurality of multi-CPU systems constructed in the same manner as the multi-CPU system 33 may be connected to the host computer 35. In this instance as well, so that access to all CPU blocks connected to the network interface 22 and shared memory 23 may be transparently carried out by means of a software utilizing a protocol belonging to an upper rank as compared with a data link layer in a network seven-hierarchy reference model of an ISO. This permits operation programs for a plurality of such multi-CPU systems 33 to be concurrently renewed using communication from the signal host computer 35. It is a matter of course that it is not required to modify the ROM of each of the multi-CPU systems 33. Thus, time and labor required for management of a version of the operation programs are substantially reduced. Such an advantage is increased with an increase in number of the multi-CPU systems dispersedly arranged.

In the illustrated embodiment, the master CPU block 2 and slave CPU block 29 may be realized using any suitable commercially available board such as, for example, a PC/AT compatible or interchangeable board, a VME board or the like. Also, the measure/control function blocks 31 and 32 each may be likewise realized using any suitable commercially available board. The shared memory 23, the buses 9 and 31, and a back board mounted thereon with sockets for the above-described boards may be permitted to cooperate with each other to realize the system of the illustrated embodiment.

The ROM 27 constituted of such a commercially available board does not have the activation program for down-loading the program for the master-side section 1 through the shared memory 23 set therein, therefore, it is required to store the activation program in the ROM 27.

The illustrated embodiment is so constructed that two such measure/control function blocks 31 and 32 are connected to the bus 24 for the slave-side section 29. Alternatively, a number of measure/control function blocks which are identical or different in function with or from each other may be connected to the bus. In this instance as well, all the measure/control function blocks connected to the bus 24 of the slave-side section 29 may be controlled through the CPU 26 of the slave-side section 29.

Also, in the illustrated embodiment, a plurality of multi-CPU systems 33 are connected to the single host computer 35 by way of example. Alternatively, the illustrated embodiment may be constructed in such a manner that the multi-CPU systems 33 are connected to each other through the communication line 34, to thereby permit any specific one of the multi-CPU systems 33 to function like the above-described host computer 35.

More particularly, in general, the multi-CPU systems control the measured/controlled equipments 30 respectively connected thereto. On the contrary, in the illustrated embodiment, only the storage means 6 of any one of the multi-CPU systems 33 is stored therein with the operation program, resulting in the program being down-loaded to the slave-side section 29 of each of the remaining multi-CPU systems 33 through the master-side section 1 corresponding thereto.

Further, in the illustrated embodiment, the driver softwares for network emulation of the shared memory 23 from both master-side section 1 and slave-side section 29 are stored in the master-side section 1 and slave-side section 29 while being separated from each other. Alternatively, they may be stored in the lump in any one of the master-side section 1 and slave-side section 29. However, storage of the driver softwares in the respective sections 1 and 29 permits the shared memory 23 to be rapidly started up or activated as the network interface as compared with the storage in the lump.

Moreover, in the master-side section 1, the driver software is stored in the storage means 6 connected to the master CPU block 2. Alternatively, it may be stored in the ROM 4 of the master CPU block 2.

Figure 4:
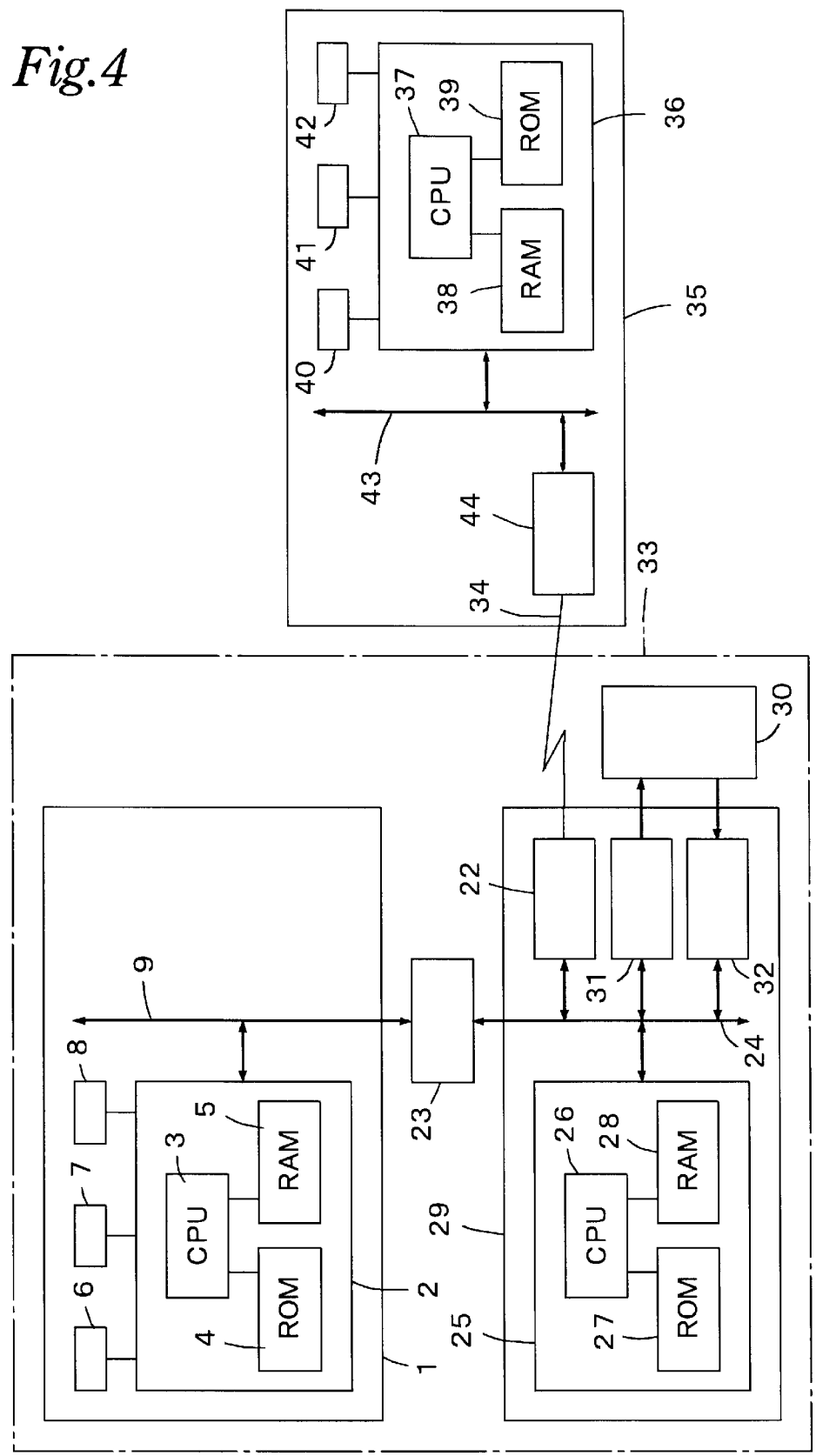
FIG. 4 is a block diagram showing a fourth embodiment of a multi-CPU system according to the present invention.

Referring now to FIG. 4, a fourth embodiment of a multi-CPU system according to the present invention is illustrated. A multi-CPU system of the illustrated embodiment is constructed in substantially the same manner as the third embodiment described above, except that a network interface 22 is connected to a bus 24 for a slave-side section 29. The slave-side section 29 is connected to a host computer 35 through the network interface 22 and a communication line 34. A storage means 6 of a master-side section 1 is stored therein with a driver software for emulating a shared memory 23 as a network interface.

Also, a ROM 27 of a slave CPU block 21 is stored therein with a driver software for emulating the shared memory 23 as a network interface from the slave-side section 29, as well as a driver software for driving the network interface 22. In addition, a storage memory 40 of the host computer 35 is stored therein with a driver software for driving a network interface 44, as well as an operation program for down-loading a program to a RAM 28 of the slave CPU block 21, as in the third embodiment described above.

In the fourth embodiment as well, activation of a multi-CPU system 33 and the host computer 35 leads to driving of the network interfaces 22 and 44 and permits the shared memory 23 to be emulated as a network interface. Then, the activation program stored in the ROM 27 of the slave CPU block 21 permits the operation program stored in the storage means 40 of the host computer 35 to be down-loaded through the network interface 22 of the slave-side section 29 to the RAM 28 of the slave CPU block 21.

After such down-loading of the operation program is terminated, the slave-side section executes the program downloaded to the RAM 28 of the slave CPU block 21. Control of a measured/controlled equipment 30 in the slave-side section 29 may be carried out in substantially the same manner as in the third embodiment described above. Also, the host computer 35 may be replaced with a master-side section 1 of another multi-CPU system 33. Further, a plurality of multi-CPU systems 33 may be connected through a slave-side section 29 thereof to each other as in the third embodiment.

In the present invention, the network interface 22 may be provided on either a side of the master-side section 1 or that of the slave-side section 29 as in the third and fourth embodiments described above. Such arrangement of the network interface 22 may be determined depending on input of data directly to an OS of either the master-side section or the slave-side section 29. Also, arrangement of the network interface 22 at the section which is rather decreased in load permits the multi-CPU system 33 to disperse the load.

Also, in the multi-CPU system 33 of each of the third and fourth embodiments, the master-side section 1 and slave-side section 29 are connected to each other through the buses 9 and 24 and shared memory 23, so that data communication therebetween may be carried out at an increased speed. Data inputted from the host computer 35 through the communication line 34 to the multi-CPU system 33 are transmitted in the system 33 at a speed increased to a level incomparable with that of data communication using an external communication line. Thus, there does not substantially occur a difference between input of data to the master-side section 1 and that to the slave-side section 29.

Figure 5:
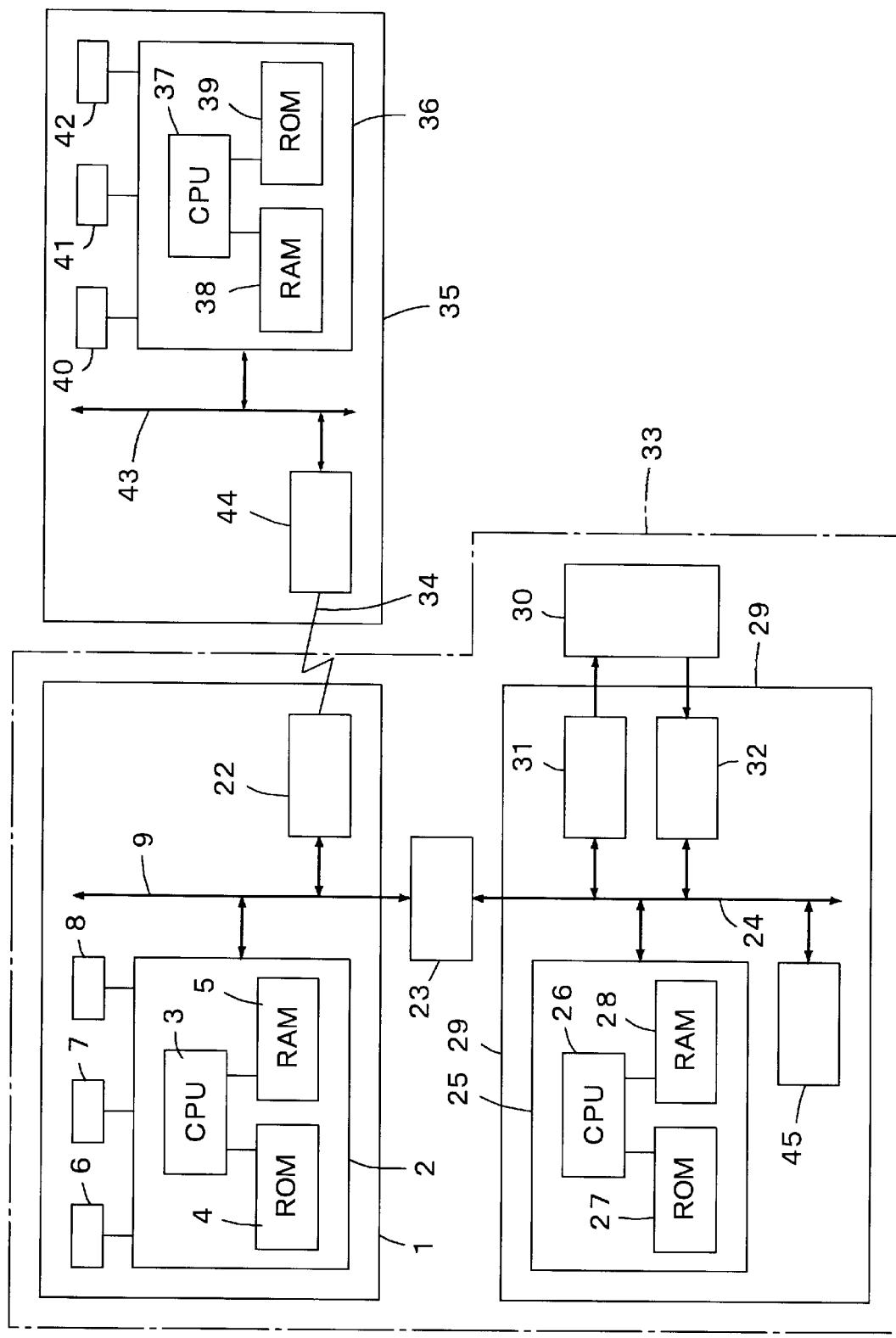
FIG. 5 is a block diagram showing a fifth embodiment of a multi-CPU system according to the present invention.

Referring now to FIG. 5, a fifth embodiment of a multi-CPU system according to the present invention is illustrated. A multi-CPU system of the illustrated embodiment designated at reference numeral 33 is constructed in substantially the same manner as the third embodiment described above, except that a ROM 45 is connected to a bus 24 for a slave-side section 29. A slave CPU block 25 may be constituted by any suitable commercially available board such as, for example, a PC/AT compatible board or the like. The ROM 45 is stored therein with an activation program for down-loading a program to a RAM 28 of the slave CPU block 25 as in the ROM 27 in the third embodiment described above.

Upon starting-up or activation of the multi-CPU system of the illustrated embodiment, a control program stored in a storage means 40 of a host computer 35 is down-loaded to the RAM 28 of the slave-side section 29. Then, a control program stored in the RAM 28 of the slave-side section 29 permits a CPU 26 to control measure/control function blocks 31 and 32 in substantially the same way as the third embodiment described above.

In the multi-CPU system of the illustrated embodiment, the ROM 45 having the activation program for down-loading stored therein is connected to the bus 24, to thereby eliminate a necessity of setting the activation program in a ROM 27 of the slave CPU block 25. This permits a commercially available board which is not involved in setting of the activation program to be used for the ROM 27.

Figure 6:
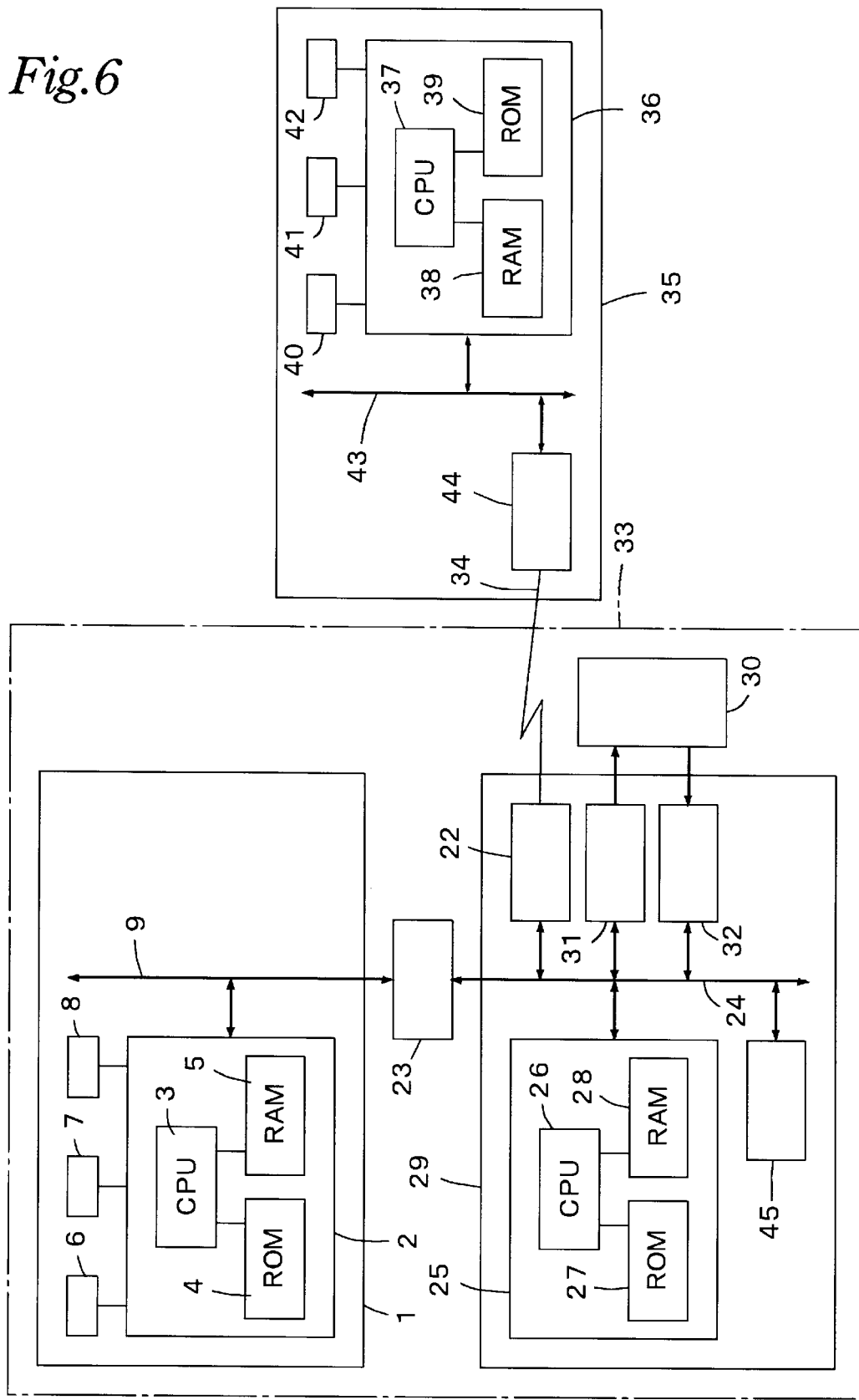
FIG. 6 is a block diagram showing a sixth embodiment of a multi-CPU system according to the present invention.

Referring now to FIG. 6, a sixth embodiment of a multi-CPU system according to the present invention is illustrated. A multi-CPU system of the illustrated embodiment designated at reference numeral 33 is constructed in substantially the same manner as the fourth embodiment described above, except that a ROM 45 of a slave-side section 29 is connected to a bus 24 for the slave-side section 29. A slave CPU block 25 may be constituted by any suitable commercially available board such as, for example, a PC/AT compatible board or the like as in the fifth embodiment described above.

Upon starting-up or activation of the multi-CPU system of the illustrated embodiment, a control program stored in a storage means 40 of a host computer 35 is down-loaded to a RAM 28 of the slave-side section 29 through a network interface 22 of the slave-side section 29. Then, a control program stored in the RAM 28 of the slave-side section 29 permits a CPU 26 to control measure/control function blocks 31 and 32 in substantially the same way as the fourth embodiment described above.

In the multi-CPU system of the illustrated embodiment, the ROM 45 having the activation program for down-loading stored therein is connected to the bus 24, to thereby eliminate a necessity of setting the activation program in a ROM 27 of the slave CPU block 25. This permits a commercially available board which is not involved in setting of the activation program to be used for the ROM 27 as in the second and fifth embodiments.

In each of the third to sixth embodiments described above, the shared memory 23 is utilized as the network interface, so that the software is used for network emulation. Alternatively, the shared memory 23 may be constructed so as to exhibit a software-like function. In this instance, a dual port memory, a first-in first-out (FIFO) or the like which is conventionally used in the art may be used for this purpose.

As can be seen form the foregoing, the multi-CPU system of the present invention is so constructed that the slave-side section is controlled according to the program by the single CPU. Such construction permits the control program to be constructed on the slave-side section in spite of the fact the OS mounted in the mater-side section is free of real-time properties, resulting in facilitating preparation of the control program.

Also, in the present invention, the control program is down-loaded to the RAM of the slave-side section, to thereby eliminate a change of the ROM of the slave-side section with a change of the program, to thereby facilitate a change of the program.

Further, the multi-CPU system of the present invention may be constructed so that the control program may be down-loaded through communication by means of the storage means outside the multi-CPU system. Such construction permits the program to be renewed without changing the multi-CPU system and the control programs of a plurality of multi-CPU systems to be concurrently renewed. This leads to an increase in maintenance properties of the multi-CPU system.

In addition, the present invention permits the shared memory to be provided with a network emulation function by means of a software, resulting in utilizing a dual port memory, an FIFO or the like which is conventionally used in the art.

Moreover, in the present invention, the ROM having the activation program for down-load set therein may be connected directly to the bus for the slave-side section, so that any commercially available board may be used for the slave CPU block.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A multi-CPU system comprising:

a master CPU block having a storage means connected thereto;

a slave CPU block including a CPU, a ROM and a RAM;

a bus means arranged so as to connect said master CPU block and slave CPU block to each other therethrough;

a shared memory connected to an intermediate portion of said bus means;

said shared memory being arranged so as to separate the multi-CPU system into a master-side section and a slave-side section therethrough;

said bus means including a bus arranged for said master-side section and a bus arranged for said slave-side section; and measure/control function blocks connected between said bus for said slave-side section and a measured/controlled equipment;

said ROM of said slave CPU block being stored therein with an activation program for down-loading a program from said storage means to said RAM of said slave CPU block and being connected to said bus for said slave-side section;

said RAM of said slave CPU block being stored therein with the program down-loaded from said storage means, resulting in the measured/controlled equipment being controlled through said measure/control function blocks according to the program.

2. A multi-CPU system comprising:

a master CPU block;

a slave CPU block including a CPU, a ROM and a RAM;

a bus means arranged so as to connect said master CPU block and slave CPU block to each other therethrough;

network interfaces connected to said bus means;

a shared memory constructed so as to exhibit a network emulation function and connected to an intermediate portion of said bus means;

said shared memory being arranged so as to separate the multi-CPU system into a master-side section and a slave-side section therethrough;

said bus means including a bus arranged for said master-side section and a bus arranged for said slave-side section; and measure/control function blocks connected between said bus for said slave-side section and a measured/controlled equipment;

said ROM of said slave CPU block being stored therein with an activation program for down-loading a program to said RAM of said slave CPU block and being connected to said bus for said slave-side section;

said RAM of said slave CPU block being stored therein with the program down-loaded through said bus means, resulting in the measured/controlled equipment being controlled through said measure/control function block according to the program.

3. A multi-CPU system as defined in claim 2, wherein said network interfaces are arranged on said master-side section.

4. A multi-CPU system as defined in claim 2, wherein said network interfaces are arranged on said slave-side section.

5. A multi-CPU system as defined in claim 2, further comprising a storage means stored therein with a driver software for emulating said shared memory as a network interface.

6. A multi-CPU system as defined in claim 1, wherein said ROM of said slave CPU block is stored therein with an activation program for down-loading the program to said RAM of said slave CPU blocks and connected directly to said bus for said slave-side section.

7. A multi-CPU system as defined in claim 2, wherein said ROM of said slave CPU block is stored therein with an activation program for down-loading the program to said RAM of said slave CPU block and connected directly to said bus for said slave-side section.

* * * * *

UNITED STATES PATENT AND TRADEMARK OFFICE
CERTIFICATE OF CORRECTION

PATENT NO. : 6,253,233 B1  
DATED : June 26, 2001  
INVENTOR(S) : Hayashi

Page 1 of 1

It is certified that error appears in the above-identified patent and that said Letters Patent is hereby corrected as shown below:

<u>Title page,</u>  
Item [54] "MULTI-CUT SYSTEM" should read -- MULTI-CPU SYSTEM --

Item [75], "Omiya (JP)" should read -- Omiya-shi --

Signed and Sealed this

Ninth Day of April, 2002

Attest:

JAMES E. ROGAN  
*Director of the United States Patent and Trademark Office*

*Attesting Officer*